United States Patent
Sisk et al.

(10) Patent No.: US 7,422,193 B2
(45) Date of Patent: Sep. 9, 2008

(54) SOLENOID VALVE

(75) Inventors: Gregory E. Sisk, Farmington, MO (US); Tom Farace, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 133 days.

(21) Appl. No.: 11/512,741

(22) Filed: Aug. 30, 2006

(65) Prior Publication Data

US 2007/0069166 A1 Mar. 29, 2007

Related U.S. Application Data

(60) Provisional application No. 60/713,048, filed on Aug. 31, 2005.

(51) Int. Cl.
*F16K 31/00* (2006.01)
(52) U.S. Cl. .................................. 251/64; 251/129.15
(58) Field of Classification Search ............... 251/64, 251/129.15
See application file for complete search history.

(56) References Cited

U.S. PATENT DOCUMENTS

| | | | |
|---|---|---|---|
| 3,484,076 A | 12/1969 | Naumann | 251/141 |
| 3,578,284 A | 5/1971 | Martini | 251/88 |
| 3,737,141 A * | 6/1973 | Zeuner | 251/129.07 |
| 3,782,686 A * | 1/1974 | Cowie | 251/309 |
| 5,417,403 A | 5/1995 | Shurman et al. | 251/129 |
| 5,553,829 A | 9/1996 | Hemsen | 251/129 |
| 5,565,832 A * | 10/1996 | Haller et al. | 335/249 |
| 5,603,482 A | 2/1997 | Mott et al. | 251/129 |
| 6,390,445 B2 * | 5/2002 | Fukano | 251/129.19 |
| 6,830,232 B2 * | 12/2004 | Burrola et al. | 251/64 |

FOREIGN PATENT DOCUMENTS

| CN | 2607484 Y | 3/2004 |
|---|---|---|
| JP | 2002 213635 | 7/2002 |

OTHER PUBLICATIONS

International Search Report and Written Opinion Of International Searching Authority (PCT/US06/34327).

* cited by examiner

*Primary Examiner*—John K Fristoe, Jr.
(74) *Attorney, Agent, or Firm*—Harness, Dickey & Pierce, P.L.C.

(57) ABSTRACT

A solenoid valve is provided that includes an inlet, an outlet, a valve seat in the flow path between the inlet and the outlet, a stationary core, and a moveable member for moving between an open position and a closed position against the valve seat. A resilient dampening member is disposed between the moveable member and the stationary core, and is independent from both the stationary core and the moveable member. A spring biases the resilient dampening member against the stationary core and the moveable member away from the stationary core to a closed position. Upon energizing a solenoid with a direct current voltage, the moveable member moves from the closed position towards the stationary member to an open position against the resilient dampening member. The resilient dampening member dampens the impact between the moveable member and the stationary core to reduce the noise associated with energizing the solenoid.

20 Claims, 5 Drawing Sheets

SOLENOID VALVE

CROSS-REFERENCE TO RELATED APPLICATIONS

This application claims the benefit of U.S. Provisional Patent Application Ser. No. 60/713,048, filed Aug. 31, 2005, the entire disclosure of which is incorporated herein by reference.

FIELD

The present invention relates to solenoids, and more particularly to solenoids that operate without producing significant noise.

BACKGROUND

AC solenoids are often employed in various types of alternating current (AC) powered equipment because of the availability of AC power. The typical AC powered solenoid produces a buzzing noise when the solenoid is powered in its energized or actuated position. This buzzing noise is generated as a result of the alternating current cycling between positive and negative current at 60 cycles per second. The solenoid is held in the energized position by an alternating current that generates a magnetic force, which diminishes when the alternating current cycles between positive and negative current and permits slight movements that create a buzzing noise. A shading ring may be used to create a secondary magnetic force, to help reduce the buzzing noise of the AC solenoid. The energizing of a solenoid also produces an audible click as a result of an impact that occurs when the solenoid moves to its fully energized position. In flow control solenoids that may be energized millions of times, this impact can produce undesirable noise as well as considerable wear that the solenoid may not be able to withstand.

SUMMARY

In various embodiments of the present invention, a solenoid operated valve is provided that includes an inlet, an outlet, a valve seat in the flow path between the inlet and the outlet, a stationary core, and a moveable member for moving between an open position and a closed position against the valve seat. A resilient dampening member is disposed between the moveable member and the stationary core, and is independent from both the stationary core and the moveable member. A spring biases the resilient dampening member against the stationary core and the moveable member away from the stationary core to a closed position. A solenoid may be energized by application of a direct current voltage or a rectified alternating current to move the moveable member from the closed position towards the stationary member to an open position against the resilient dampening member. Accordingly, some embodiments of a solenoid valve provide a resilient dampening member that dampens the impact between the moveable member and the stationary core to reduce the noise associated with energizing the solenoid.

In another aspect of the invention, some embodiments of a solenoid valve include a valve seat between an inlet and outlet, and a movable member with an annular ring, where the movable member is movable between an open and a closed position. The solenoid valve includes a stationary core, a resilient dampening member disposed between the moveable member and the stationary core, and a spring for biasing the resilient dampening member against the stationary core. The spring also biases the moveable member to a closed position against a stop, in which position a valve element is biased against the valve seat and the annular ring of the moveable member does not engage the valve element. A solenoid may be energized by a direct current voltage or a rectified alternating current to move the movable member towards the resilient dampening member to an open position. Upon energizing the solenoid, the annular ring on the movable member engages and moves the valve element away from the valve seat, and the resilient dampening member prevents direct contact between the moveable member and the stationary member. Upon de-energizing the solenoid, the biasing spring moves the movable member and valve element toward the valve seat, where the annular ring disengages from the valve element before the movable member engages the stop so that the impact of the moveable member against the stop is not imparted on valve element. Accordingly, some embodiments of a solenoid valve provide for substantially reducing the impact force of the valve element against the valve seat to preserve the life of the valve element, and also provide for dampening the impact between the movable member and stationary core to reduce the noise associated with energizing the valve.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

Figure 1:
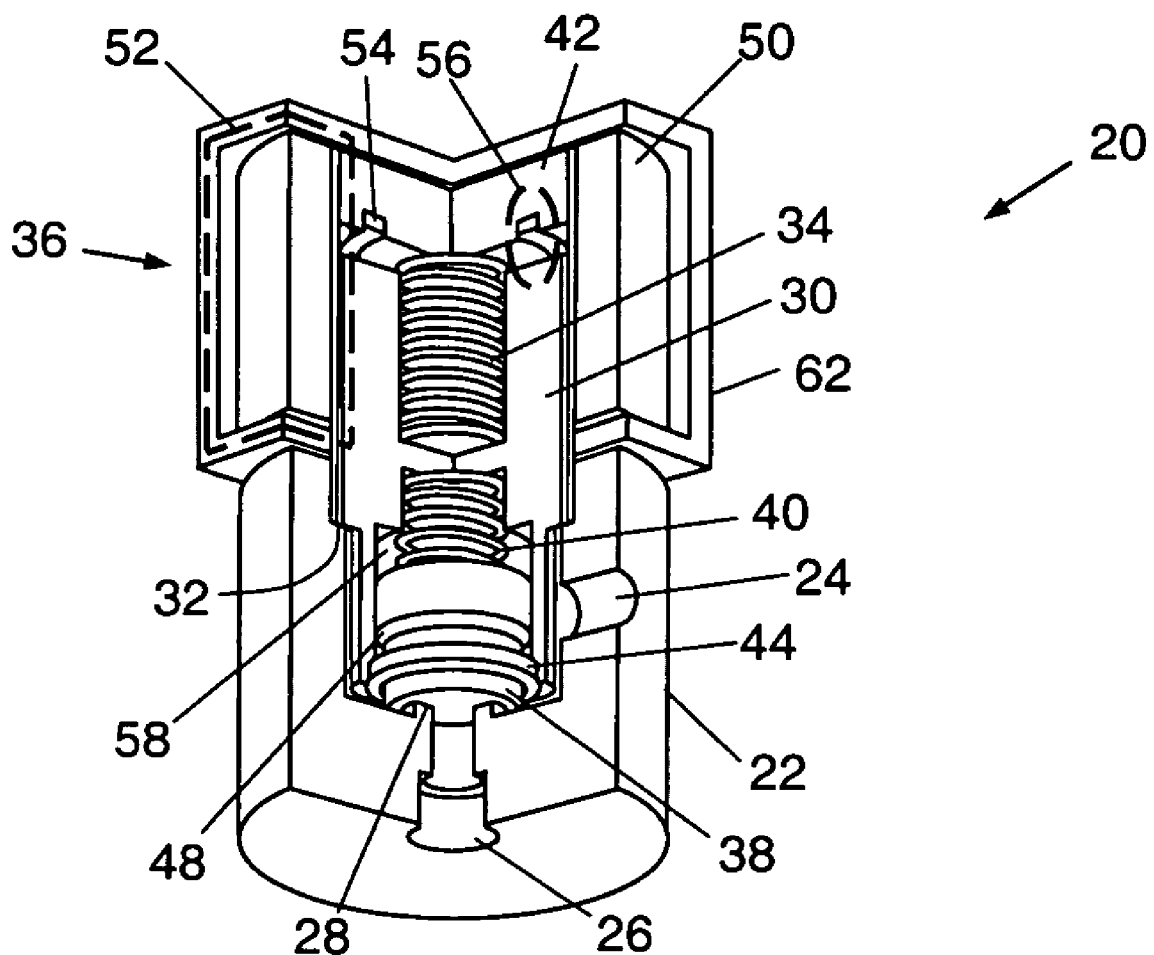
FIG. 1 is a cross-sectional bottom perspective view of one embodiment of a solenoid valve in accordance with the principles of the present invention.

One embodiment of a solenoid valve in accordance with the principles of the present invention is indicated generally as 20 in FIG. 1. The solenoid valve 20 comprises a valve housing 22 having at least one inlet 24 and at least one outlet 26. A valve seat 28 is positioned in the flow path between the inlet 26 and the outlet 26. Engaging the valve seat 28 is a valve element 38 coupled to a valve member 30, which is movable to open and close the valve. The valve housing 22 includes a stop 32 that limits the travel of the movable valve member 30. A spring 34 biases the moveable valve member 30 toward the stop 32 to a closed position. The spring 34 is a coil spring, but the spring 34 could be any other element for applying a resilient force to the valve member 30, biasing it toward the stop 32. In the closed position, the valve element 38 coupled to the valve member 30 is biased by a spring 40 towards sealing. engagement with the valve seat 28. The spring 40 is a coil spring but could be any other element for applying a resilient force to the valve element 38, biasing it toward the seat 28. Thus, in the closed position the spring 34 biases the movable valve member 30 against the stop 32, and the spring 40 biases the valve element 38 against the seat 28.

When the movable valve member 30 moves to an open position, an annular ring 44 on the movable valve member engages and moves the valve element 38 away from the valve seat 28. The movable valve member 30 has a central passage 50 in one end, for receiving the spring 34 that biases the moveable valve member 30 away from the stationary core 42 and towards the stop 32. A chamber opening 58 in the opposite end of the valve member 30 provides for receiving the valve element 38. The mouth of the chamber 58 has a ring 44 that engages a shoulder 48 formed on the valve element 38, for retaining the valve element 38 in the chamber. A passage 24 extends inwardly from the chamber 58, for receiving the spring 40, one end of which engages the valve member 38 and the other end of which engages the valve element 38 to bias the valve element 38 toward the valve seat 28. In some embodiments, the valve element 38 may be made of a lightweight fluorinated hydrocarbon polymer such as Teflon™, or other polymeric or resilient sealing material, or a combination of different materials bonded together.

A solenoid 36 is disposed around the movable valve member 30. The solenoid 36 provides for moving the movable valve member 30 against the bias of the spring 34 away from the stop 32 towards the stationary core 42. An annular ring 44 at the end of the movable valve member 30 provides for pulling the valve element 38 away from the valve seat 28 to an open position. In the closed position, the annular ring 44 on the movable valve member 30 does not engage. the valve element 38, which is biased by spring 40 against the valve seat 28. When the solenoid 36 is energized, it moves the movable valve member 30 against the bias of the spring 34 away from the stop 32. The initial movement of the valve member 30 establishes momentum prior to engaging the valve element 38, for imparting a force to the valve element 38 that helps unseat the valve element. Energizing the solenoid causes the movable valve member 30 and annular ring to engage and move the valve element 38 away from the seat 28, so that the valve is open and fluid can flow into the inlet 24 through the valve and out the outlet 26. When the solenoid 36 is de-energized, the spring 34 biases the movable valve member 30 towards the closed position. As the movable valve member 30 moves toward a closed position, the valve element 38 contacts the valve seat 28, and stops moving. The spring 34 will continue to move the movable valve member 30 beyond the point of closure of the valve element 38, until the moveable valve member 30 contacts the stop 32. The stop 32 arrests further movement of the valve member 30, and absorbs the impact of its momentum, such that the impact energy is not transferred to valve member 38 and valve seat 28. Thus, the momentum of the valve member 30 does not result in an impact force of the valve element 38 against the valve seat 28, reducing damage to the valve element 38 and valve seat 28 and extending the useful life of the valve 20.

Figure 2:
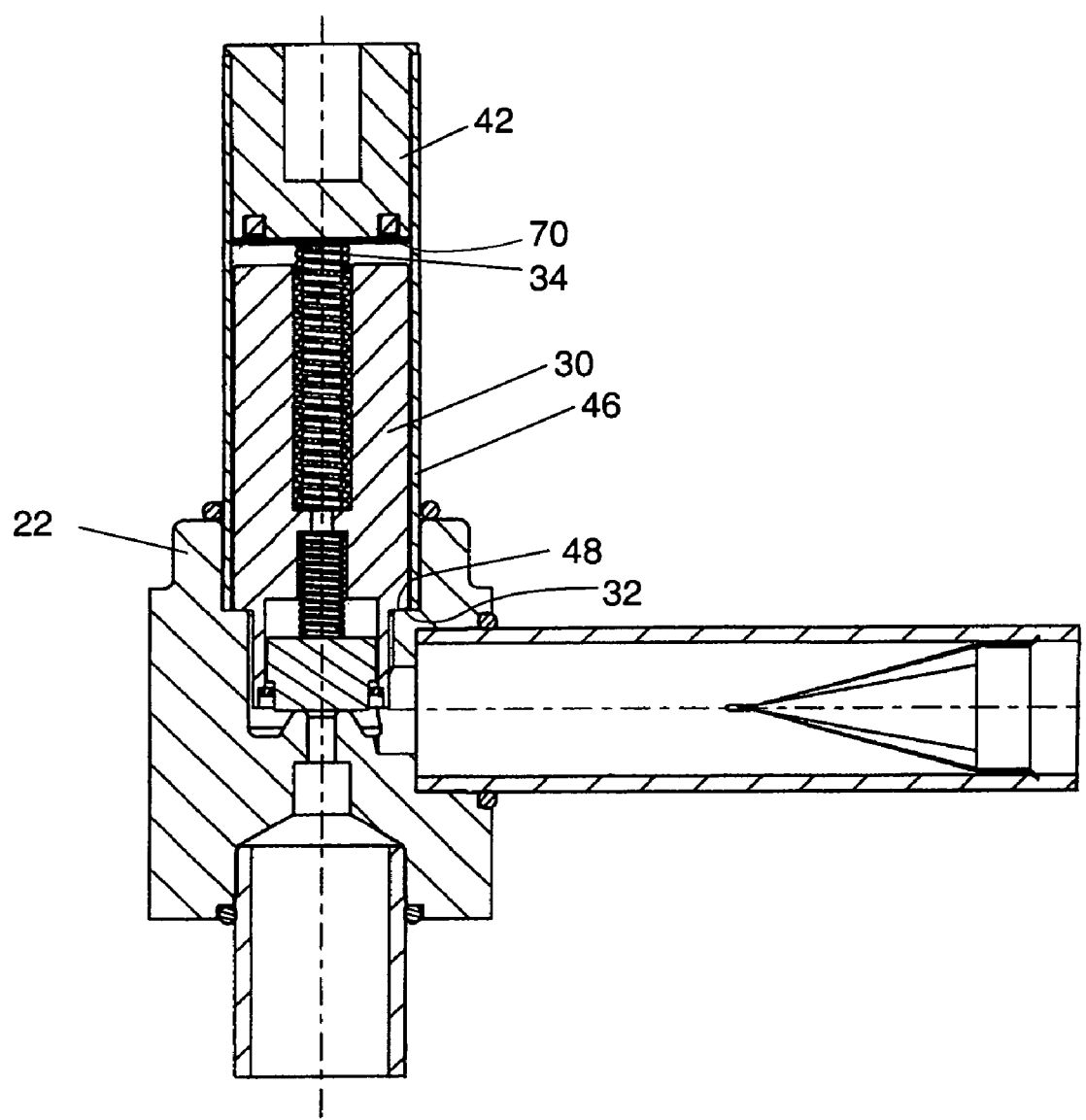
FIG. 2 is a cross-sectional side elevation view of one embodiment of a solenoid valve.

Referring to FIG. 2, the solenoid valve 20 preferably includes a tube 46 having one end secured to the valve housing 22, and a stationary core 42 secured within the opposite end. The movable valve member 30 is slideably disposed in the tube 46, and the stop 42 limiting the travel of the moveable member 30 is formed at the junction between the first end of the tube 46 and the valve body 22. A circumferential shoulder 48 extending around the moveable valve member 30 provides for engaging the stop 32. As shown in FIG. 1, a coil 50 of the solenoid 36 is disposed around the tube 46 and movable valve member 30. When the coil 50 is energized, the solenoid produces a magnetic force that moves the movable member 30 and valve element 38 to an open position. Upon de-energizing the solenoid, the spring 34 provides a force to move the movable valve member 30 towards the stop. As the movable valve member 30 moves toward the stop, the valve element 38 contacts the valve seat 28. The shoulder 48 on the valve member 30 eventually engages the stop 32, stopping further movement of the valve member and absorbing impact. Thus, while the valve member has an effective mass to be operated by the solenoid 36 and to close the valve quickly when the solenoid is de-actuated, the valve element 38 is spared from the brunt of the momentum and impact of the valve member moving toward its closed position, thereby preserving the life of the valve element 38 and the valve seat 28. Testing of various samples of one preferred embodiment of a solenoid valve incorporating the principles of the present invention has yielded 32 million cycles of flow control operation at 140 psig. Thus, the solenoid valve provides an economical, robust valve design that can operate for a significant number of cycles without failure by substantially reducing the impact force of the valve element against the valve seat when the valve is closed.

In the various embodiments, a solenoid valve is provided that comprises a coil 50 that produces a magnetic field 52 when energized by a power source. The magnetic field 52 produces a force that acts to move moveable member 30 towards the stationary core 42. Some embodiments may have a stationary core 42 that further comprises a conductive shading ring 54, which serves to establish a secondary magnetic field 56 where the solenoid embodiment may also be used in an AC voltage application. The various embodiments comprise a solenoid coil 50 that is at least adapted to be energized by a direct current (DC) voltage or a rectified alternating current source. Energizing the solenoid coil with a DC voltage source or a rectified alternating current source provides for solenoid operation at a much lower noise level than with an AC voltage source, because the non-cyclic nature of the power source provides a more consistent electromagnetic field that that produced by an alternating current solenoid.

Figure 3:
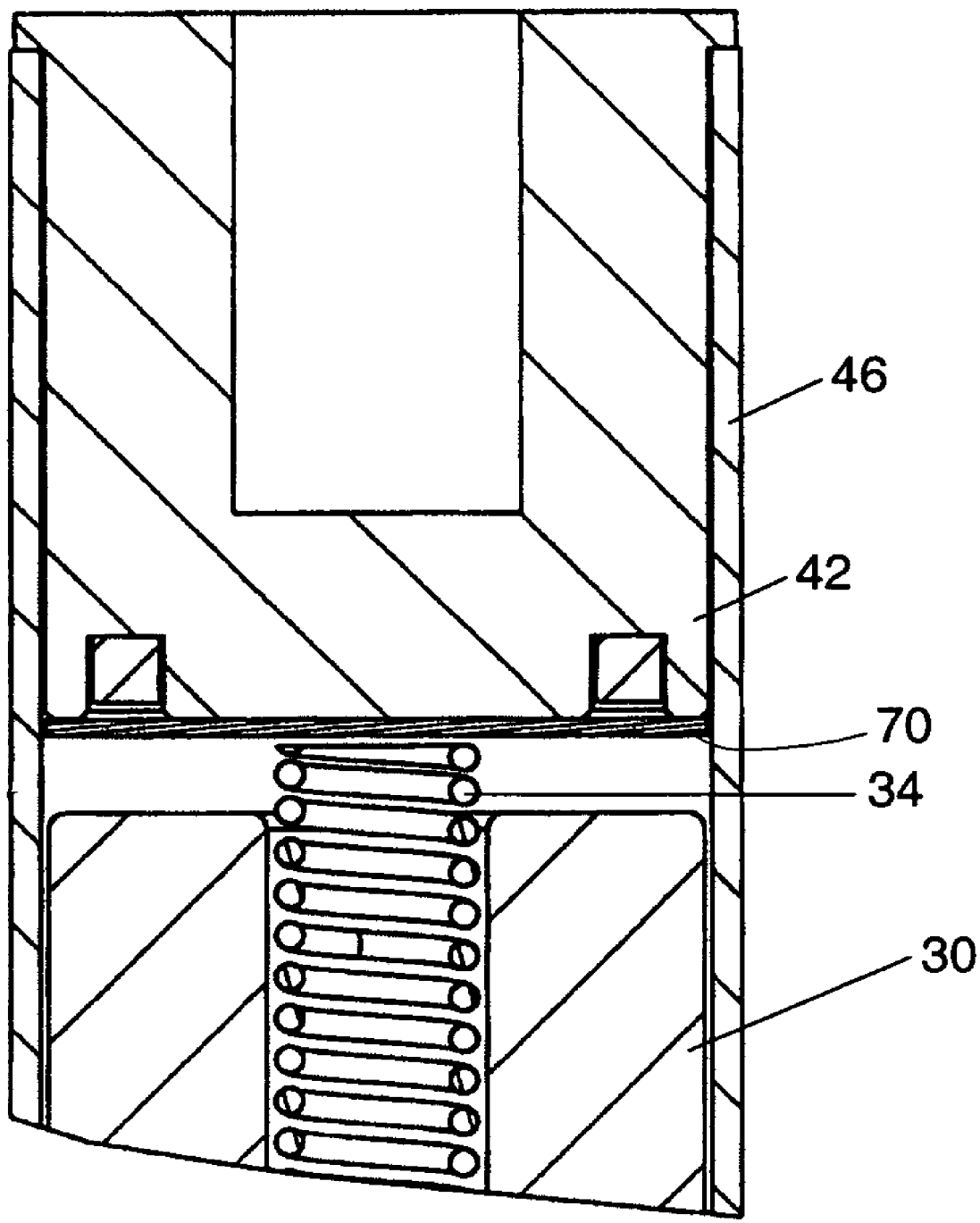
FIG. 3 is an enlarged cross-sectional view of a portion of one embodiment of a solenoid valve.

Referring to FIG. 3, the various embodiments further comprise a resilient dampening member 70 associated with the stationary core 42, for preventing direct contact between the moveable member 30 and the stationary core 42. The resilient dampening member 70 preferably has an outer diameter close to that of the stationary core 42. One end of spring 34 is in contact with the resilient dampening member 70, and the other end of spring 34 biases the movable member 30 away from the resilient dampening member 70 and the stationary core 42. When the solenoid is energized to move the movable member 30 towards the stationary core 42, the resilient dampening member dampens the impact between the moveable member 30 and the stationary core 42. The resilient dampening member accordingly provides for reducing the noise associated with energizing the solenoid to less than a predetermined decibel value.

In some embodiments, the stationary core 42 is preferably welded or braised to the tube 46 to provide a hermetic seal. The resilient dampening member 70 is independent from the stationary core 42, and is not pre-assembled, insert molded, glued or adhered to, or swaged on to the stationary core 42. This allows the stationary core 42 to be welded to the tube without possibly damaging the resilient dampening member 70. Likewise, the resilient dampening member 70 is independent from the moveable member 30, and is not pre-assembled, insert molded, adhered to, or swaged onto the movable member 30. The resilient dampening member 70 accordingly is not insert molded within or over either the stationary core 42 or movable member 30. Rather, the resilient dampening member 70 may be easily placed within the tube 46 so as to be disposed between the stationary core 42 and the movable member 30, and is biased by the spring 34 against the stationary core 42. By virtue of the spring 34 biasing the resilient dampening member 70 in position against the stationary core 42, a simple resilient dampening member 70 is provided in the various embodiments that may be easily assembled without requiring any gluing, application of adhesive, or affixing to the stationary core 42 or moveable member 30.

In the normally closed valve position shown in FIG. 3, the moveable member 40 is separated from the resilient damping member 70 by a gap of a predetermined size depending on the desired stroke of the solenoid design. When the solenoid is energized, the moveable member 30 moves towards the stationary core 42. The resilient damping member 70 provides a cushion for absorbing the shock or impact between the moveable member 30 and the stationary core 42 when the moveable member 30 moves to the fully open position. The resilient dampening member is compressed by the movable member 30 to dampen the impact, and to absorb the shock. The resilient dampening member 70 is preferably made of rubber or a flouroelastomer, but may alternatively be made of any material capable of being compressed to suitably dampen or absorb the impact as in the present solenoid embodiments. The quiet operation and extended service life this valve is particularly well suited for use in a compressor, which because of the long service life of the valve can be operated continuously to reduce start-up wear on the compressor and motor.

Figure 4:
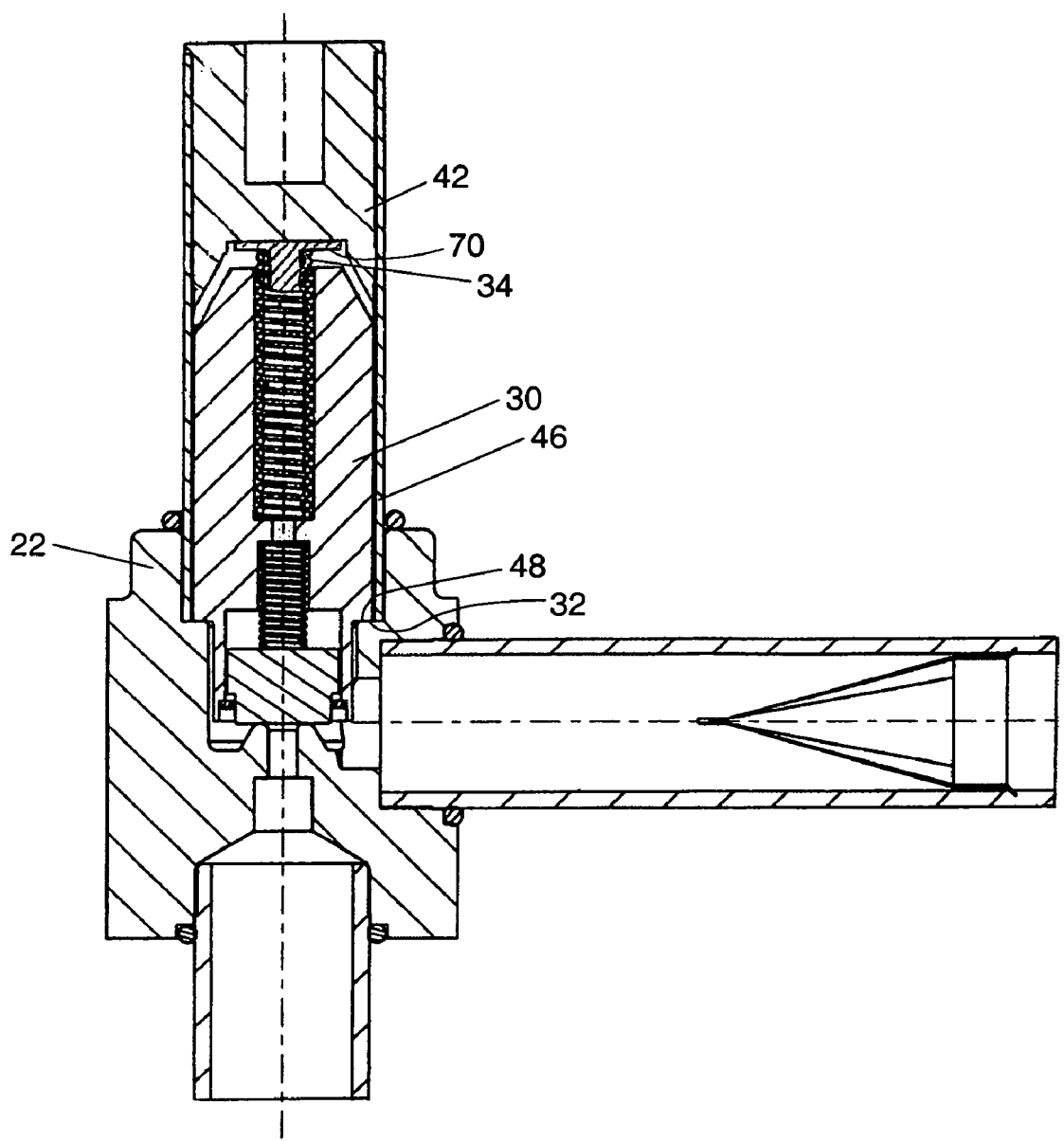
FIG. 4 is an enlarges cross-sectional view of another embodiment of a solenoid valve.

In one alternate embodiment of a solenoid shown in FIG. 4, the end of the movable member 30' and the end of the stationary member 42' comprise a generally frustro-conical shape. A resilient dampening member 70' is associated with the stationary core 42', for preventing direct contact between the moveable member 30' and the stationary core 42'. One end of spring 34 is in contact with the resilient dampening member 70', and the other end of spring 34 biases the movable member 30' away from the resilient dampening member 70 and the stationary core 42'. When the solenoid is energized to move the movable member 30' towards the stationary core 42', the resilient dampening member 70' dampens the impact between the moveable member 30' and the stationary core 42'. The resilient dampening member 70' is independent from the stationary core 42', and is not pre-assembled, insert molded, glued or adhered to, or swedged on to the stationary core 42'. In various embodiments of the invention, at least a portion of the resilient dampening member 70' may also positioned within the spring 34, as shown in FIG. 4. By virtue of the spring 34 biasing the resilient dampening member 70' in position against the stationary core 42', a simple resilient dampening member 70 is provided in the various embodiments that may be easily assembled without requiring any gluing, application of adhesive, or affixing to the stationary core 42 or moveable member 30. The resilient dampening member 70' accordingly provides for reducing the noise associated with energizing the solenoid to less than a predetermined decibel value.

Figure 5:
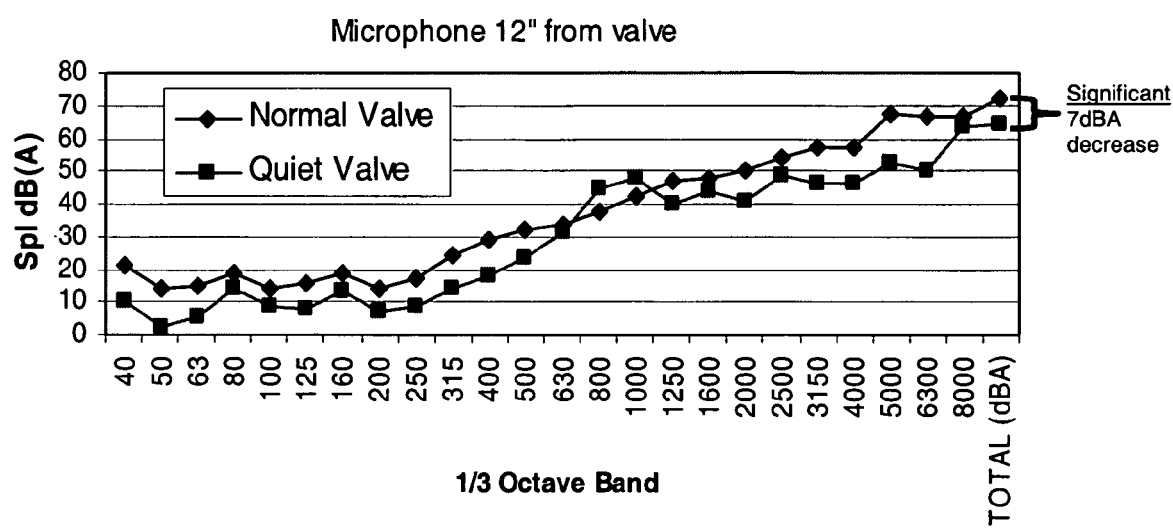
FIG. 5 is a graph illustrating the reduction in noise associated with the energizing of one embodiment of a solenoid in accordance with the principles of the present invention.

Referring to FIG. 5, a graph illustrates the reduction in noise that was achieved by one solenoid embodiment of the present invention.

The description of the invention is merely exemplary in nature and, thus, variations that do not depart from the gist of the invention are intended to be within the scope of the invention. Additional design considerations, such as the control of the application of voltage to the solenoid coil 70, may be incorporated without departing from the spirit and scope of the invention. Such variations are not to be regarded as a departure from the spirit and scope of the invention. Accordingly, it is not intended that the invention be limited by the particular embodiment or form described above, but by the. appended claims.

What is claimed is:

1. A solenoid operated valve comprising: an inlet; an outlet; a valve seat in the flow path between the inlet and outlet; a valve element for sealingly engaging the valve seat; a moveable member coupled with the valve element, the movable member being movable for opening and closing the valve; a stationary core; a resilient dampening member that is independent from and not disposed within a portion of with the stationary core; a spring having a first end engaging the resilient dampening member, and a second end biasing the movable member away from the resilient dampening member to a closed position; a solenoid that is energized by a direct current voltage which causes the movable member to move from the closed position to an open position against the resilient dampening member associated with the stationary core, wherein the resilient dampening member prevents direct contact between the moveable member and the stationary core.

2. The solenoid of claim 1 wherein the resilient dampening member is independent from the stationary core and the movable member.

3. The solenoid of claim 1 wherein the resilient dampening member dampens the impact between the moveable member and the stationary core.

4. The solenoid of claim 3 wherein the resilient dampening member is made of a material capable of being compressed to suitably dampen the impact between the moveable member and the stationary core.

5. The solenoid of claim 1 wherein the resilient dampening member reduces the noise associated with energizing the solenoid to less than a predetermined decibel value.

6. The solenoid of claim 5 wherein the predetermined decibel value is about 7 decibels or less.

7. A solenoid operated valve comprising:
an inlet;
an outlet;
a valve seat in the flow path between the inlet and the outlet;
a moveable member for moving a valve between an open and a closed position against the valve seat;
a stationary core;
a resilient dampening member disposed between the moveable member and the stationary core, the resilient dampening member being independent from and not disposed within a portion of the stationary core;
a spring for biasing the resilient dampening member against the stationary core and for biasing the moveable member away from the stationary core to a closed position; and
a solenoid that is energized by a direct current voltage which moves the moveable member from the closed position to an open position against the resilient dampening member wherein the resilient dampening member dampens the impact between the moveable member and the stationary core to reduce the noise associated with energizing the solenoid to less than a predetermined decibel value.

8. The solenoid of claim 7 wherein the resilient dampening member dampens the impact between the moveable member and the stationary core.

9. The solenoid of claim 8 wherein the resilient dampening member is made of a material capable of being compressed to suitably dampen the impact between the moveable member and the stationary core.

10. The solenoid of claim 7 wherein the resilient dampening member reduces the noise associated with energizing the solenoid to less than a predetermined decibel value.

11. A solenoid valve comprising:
a valve housing having an inlet and an outlet;
a valve seat in the flow path between the inlet and outlet;
a movable member having an annular ring, and an end that includes a chamber opening therein, the movable member being movable between an open position and a closed position against a stop;
a valve element for sealingly engaging the valve seat, the valve element having a shoulder that is received within the chamber opening and retained by the annular ring associated with the movable member;
a stationary core;
a resilient dampening member disposed between the moveable member and the stationary core but not disposed within any portion of the stationary core;
a spring for biasing the resilient dampening member against the stationary core, and for biasing the moveable member to the closed position against the stop, in which position the valve element is biased against the valve seat and the annular ring of the moveable member does not engage the valve element;
a solenoid that is energized by a direct current voltage which moves the movable member to an open position against the resilient dampening member, in which position the annular ring on the movable member engages the shoulder on the valve element and moves the valve element away from the valve seat; wherein the resilient dampening member prevents direct contact between the moveable member and the stationary core to dampen the impact between the moveable member and the stationary core.

12. The solenoid-actuated valve of claim 11, wherein energizing the solenoid establishes movement of the moveable member before the moveable member's annular ring engages the shoulder on the valve element, to provide an impact for moving the valve element away from the valve seat.

13. The solenoid actuated valve of claim 12, where upon de-energizing the solenoid, the biasing spring moves the movable member and valve element toward the valve seat, where the valve element seats against the valve seat and disengages from the annular ring before the movable member engages the stop so that the impact of the moveable member against the stop is not imparted on valve element.

14. The solenoid actuated valve of claim 13, wherein the valve element is mounted within the moveable member in a manner that permits movement of the valve element relative to the moveable member.

15. The solenoid of claim 14 wherein the resilient dampening member is independent from the stationary core and the movable member.

16. The solenoid of claim 15 wherein the resilient dampening member dampens the impact between the moveable member and the stationary core.

17. The solenoid of claim 16 wherein the resilient dampening member is made of a material capable of being compressed to suitably dampen the impact between the moveable member and the stationary core.

18. The solenoid of claim 17 wherein the resilient dampening member reduces the noise associated with energizing the solenoid to less than a predetermined decibel value.

19. The solenoid actuated valve of claim 14 wherein the resilient dampening member comprises a polymeric material.

20. The solenoid actuated valve of claim 14 wherein the valve element comprises a fluorinated hydrocarbon polymer.

* * * * *